W. T. BONNER.
RUBBER FABRIC.
APPLICATION FILED MAY 12, 1909.
981,524.
Patented Jan. 10, 1911.
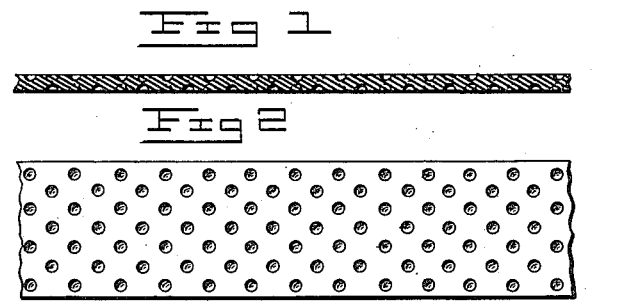
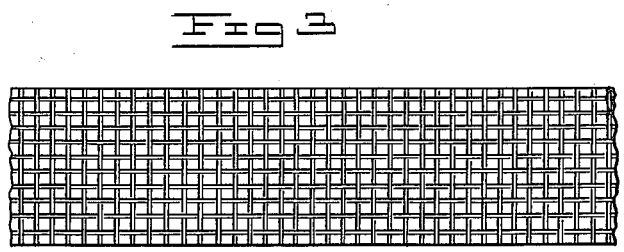
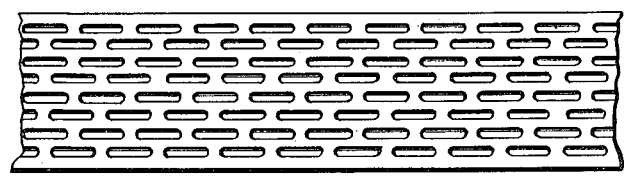
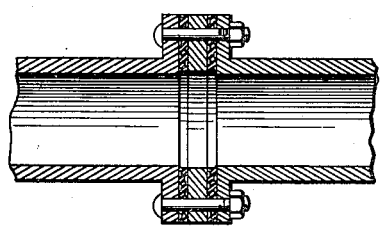
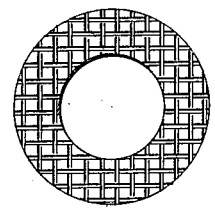
Inventor
William T. Bonner
By K. P. McElroy
Attorney
Witnesses
H. G. Robinette
A. M. Houghton

UNITED STATES PATENT OFFICE.

WILLIAM T. BONNER, OF TRENTON, NEW JERSEY, ASSIGNOR TO EMPIRE RUBBER MANUFACTURING COMPANY, A CORPORATION OF NEW JERSEY.

RUBBER FABRIC.

981,524.          Specification of Letters Patent.    Patented Jan. 10, 1911.

Application filed May 12, 1909. Serial No. 495,391.

*To all whom it may concern:*

Be it known that I, WILLIAM T. BONNER, a citizen of the United States, residing at Trenton, in the county of Mercer and State of New Jersey, have invented certain new and useful Improvements in Rubber Fabrics, of which the following is a specification.

This invention relates to rubber fabrics; and it comprises a rubber fabric or gasket of homogeneous character provided with a cupped or indented surface suitable for exerting a suction grip on metal plates and the like contacted therewith and combinations of such gaskets with elements united thereby; all as more fully hereinafter set forth and as claimed.

In the manufacture of gasket cloth for uniting flange joints of steam pipes, water pipes, air pipes and the like, the cloth is usually provided with a smooth surface or at the most a surface containing the faint indentations due to contact with canvas during vulcanizing. In the use of these gaskets between flanges, when such flanges are clamped together it is difficult to prevent the rubber slipping, squeezing or "blowing out" inasmuch as the surfaces of such flange unions are rarely truly plane or truly parallel as forced together. In a gasket union made with the ordinary types of rubber cloth, as the flanges approximate the gasket is placed under varying strains in various portions thereof, producing stresses and strains in the material which are apt to be destructive in time. And the material of the gasket tends to squeeze out toward the edges. The gasket is apt to tear while making the union and after the union is effected much of the rubber is apt to project beyond the flanges, being squeezed out. There is nothing to hold the rubber in place and under the pressure of making the union it tends to move locally under local stresses. These unions are therefore often not as good as could be desired. If the flanges be not tightly clamped together, in order to avoid this "flow" of the rubber and injurious strains and stresses therein the union is not tight. With a very tightly clamped union much of the rubber may flow beyond the line of the flanges, forming a protruding strip or edge which must be cut off.

I have discovered that by providing a homogeneous rubber gasket fabric with superficial indentations or cuppings on both sides this tendency to flow can be obviated, since each such cupping acts in the same way as a "sucker" on a stone, holding the gasket fabric locally in place and thereby distributing the stresses over the whole layer of fabric. Furthermore, in clamping the pipe flanges together the recesses or spaces in the surface of the rubber give an opportunity for local flow whereby any local unevennesses in such flanges, such as a scale spot or the like, are taken up locally. It must be remembered that although rubber will flow and yield under pressure yet this material is nevertheless absolutely incompressible in the sense that rubber exposed to pressure without an opportunity to flow or yield, will not contract in volume. Therefore, in producing pressure upon any layer of rubber, the rubber must have an opportunity to yield somewhere. With a flat-faced gasket of the ordinary types used with plane-faced parallel flanges this yielding, practically, can only be circumferential, while if the flanges do not correspond the flow will be into the low spaces also, producing strains. With the cupped fabric of the present invention, an opportunity for local yielding is afforded by the recesses or indentations uniformly distributed over the surfaces which take up the rubber flowing from a spot of localized pressure. Furthermore, as stated, these surfaces act as suction or vacuum grips, distributing the pressure very evenly throughout the gasket while flow is also opposed by frictional resistance.

In the accompanying illustration, I have shown more or less diagrammatically, sundry embodiments of the described invention.

In this showing:—Figure 1 is a section of a sheet of fabric having small cup-shaped indentations distributed over both sides; Fig. 2 is a plan view of the same; Fig. 3 is a plan view of a modified form having a deeply indented surface such as may be produced by forcing wire gauze thereinto during the manufacture; Fig. 4 shows another alternative form wherein the surfaces are provided with linear depressions; Fig. 5 shows a cut gasket ring made of the fabric of Fig. 3; and Fig. 6 shows a vertical section of a flange union with the gasket in place.

In the manufacture of the fabric of Fig. 1, the rubber sheet, which may be reinforced with wire fabric or other materials, is made from unvulcanized rubber in the usual manner and may then be vulcanized between press heads provided with a multiplicity of spaced low protuberances, the press heads on each side of the fabric being both provided with these protuberances. The fabric produced after vulcanization will be found to have the desired type of recesses or indentations.

The material of Fig. 3 may be made in the same manner, save that the press heads are provided with a facing layer, or false head of wire gauze or wire fabric. The fabric of Fig. 4 may be made by providing the press heads with a suitable series of ridges.

In practice, for most purposes, I prefer a gasket fabric of the type shown in Fig. 2 as it is easily produced without the aid of special apparatus and as the meshes of the wire fabric form a series of indentations very evenly distributed over the whole surface and of about the proper character as regards depth and width to produce the stated desired results. In such a fabric the area or volume of the projections or ridges afforded by the spaces between the wire of the wire fabric almost exactly equals the area or the volume of the depressions or indentations which are formed by the wires themselves. In producing pressure upon such a fabric therefore the compression upon the ridges can wholly be taken up by the valleys, the material of the whole gasket being substantially homogeneous so that the rubber of the projections or ridges can flow into the space of the valleys. Furthermore, since each such ridge is comparatively narrow, yielding is ready while the volume of the valley between each pair of ridges is sufficient to produce a good suction effect. Furthermore, the distribution of ridges and valleys over the whole surface of the cloth is very uniform, and so also is the desired suction effect and the desired equalization of flow. A surface ridged in this way also offers a positive frictional and pneumatic resistance against side flow.

In the stated type of gasket the presence of the local indentations obviates for the present purpose the stated incompressibility of the rubber allowing the rubber an opportunity to flow under pressure. In a flange union made with this gasket the gasket lies flat without crumpling, folding, tearing or being subjected to destructive stresses.

What I claim is:—

1. As a new article of manufacture, a sheet of resilient fabric of homogeneous character and having a flat face on each side, the surface of each such face being provided with a plurality of small and shallow but distinct indentations to produce a suction and friction surface, each of said shallow indentations being deep enough to produce suction upon compression of the sheet.

2. As a new article of manufacture, a flat gasket ring of resilient rubber fabric of homogeneous character, said ring having a flat face on each side and the surface of each such face being provided with a plurality of small and shallow but distinct indentations to produce a suction and friction surface, each of said shallow indentations being deep enough to produce suction under compression of the ring.

3. As a new article of manufacture, a flat gasket ring of resilient rubber fabric of homogeneous character and provided with a plurality of small and shallow but distinct indentations on each side forming a suction and friction surface, each of said indentations being deep enough to produce suction upon compression of said sheet.

4. As a new article of manufacture, a flat gasket ring of resilient rubber fabric of homogeneous character and provided with a plurality of small and shallow indentations on each side, said indentations presenting a general appearance similar to that of wire fabric and forming a suction and friction surface.

5. A flange union comprising a pair of flanges having between them a compressed rubber gasket layer, said gasket layer being of homogeneous character and provided with a multiplicity of indentations and adhering to the flanges on either side by a suction union.

6. A flange union comprising a pair of flanges having between them a compressed rubber gasket layer, said gasket layer being of homogeneous character and provided with a multiplicity of indentations, said indentations presenting a general appearance similar to that of wire fabric and adhering to the flanges on either side by a suction union.

7. As a new article of manufacture, a flat gasket ring of homogeneous rubber composition and provided with a plurality of small and shallow indentations on each side, the volume of the indentation cavities being about the same as the volume of the separating ridges.

In testimony whereof, I affix my signature in the presence of witnesses.

WILLIAM T. BONNER.

Witnesses:
W. A. FURMAN,
E. R. TAYLOR.